United States Patent
Joe (10) Patent No.: US 7,942,320 B2
(45) Date of Patent: May 17, 2011

(54) PARK USER MANAGEMENT SYSTEM AND PARK USER MANAGEMENT METHOD USING THE SAME

(75) Inventor: Jae Bom Joe, Seongnam-si (KR)

(73) Assignee: Dae Yang Comm, Co., Ltd., Seoul (KR)

( * ) Notice: Subject to any disclaimer, the term of this patent is extended or adjusted under 35 U.S.C. 154(b) by 433 days.

(21) Appl. No.: 12/156,236

(22) Filed: May 30, 2008

(65) Prior Publication Data

US 2008/0296372 A1 Dec. 4, 2008

(30) Foreign Application Priority Data

Jun. 1, 2007 (KR) .................. 10-2007-0053957

(51) Int. Cl.
*G07B 15/02* (2006.01)
(52) U.S. Cl. .......... 235/384; 235/492; 482/1; 340/573.1
(58) Field of Classification Search .................. 235/384, 235/492
See application file for complete search history.

(56) References Cited

U.S. PATENT DOCUMENTS

| 2006/0217232 A1* | 9/2006 | Kondrat et al. | 482/3 |
| 2007/0033069 A1* | 2/2007 | Rao et al. | 705/2 |

FOREIGN PATENT DOCUMENTS

KR 2005-78066 8/2005

* cited by examiner

*Primary Examiner* — Michael G Lee
*Assistant Examiner* — Kristy A Haupt
(74) *Attorney, Agent, or Firm* — D. Peter Hochberg; Sean F. Mellino; Daniel J. Smola (57) ABSTRACT

A park user management system having a plurality of radio frequency tag readers installed along usable routes in a park for recognizing information stored in a radio frequency tag provided to each park user and an exercise quantity management module for calculating exercise information of each park user using the respective recognition times of the radio frequency tag recognized by the radio frequency tag readers and providing the calculated exercise information to each park user. The park user management system provides a recommendable exercise, a recommendable exercise section, and a recommendable target exercise quantity to each park user, calculates actual exercise quantity of each park user on the day in question, and provides the calculated exercise quantity to each park user.

15 Claims, 4 Drawing Sheets

PARK USER MANAGEMENT SYSTEM AND PARK USER MANAGEMENT METHOD USING THE SAME

CROSS-REFERENCE TO RELATED APPLICATION

This application claims foreign priority based on Korean Patent Application Serial No. 2007-53957 filed Jun. 1, 2007, the content of which is incorporated herein by reference in its entirety.

BACKGROUND OF THE INVENTION

1. Field of the Invention

The present invention relates to a park user management system and a park user management method using the same. More particularly, the present invention relates to a park user management system that is capable of calculating exercise quantity of a park user based on routes used by the park user and use time of the park user in a park and providing tailored information to the park user, and a park user management method using the same.

2. Description of the Prior Art

With social progress, a desire for well-being, which means a type of culture which pursues the happy and beautiful life with the harmony of physical and mental health, has increased, with the result that the number of users using parks has greatly increased.

A park user takes exercise, such as walking or running along usable routes in a park, or takes exercise using exercise equipment installed in the park. When the park user uses a conventional park, however, it is not possible for the park user to acquire his/her exercise information, such as the velocity of exercise, such as walking or running, in the park or the amount of calories consumed during the exercise, unlike when he/she takes exercise on a treadmill in a health club. As a result, the park user has little motivation to take exercise in the park.

Figure 1:
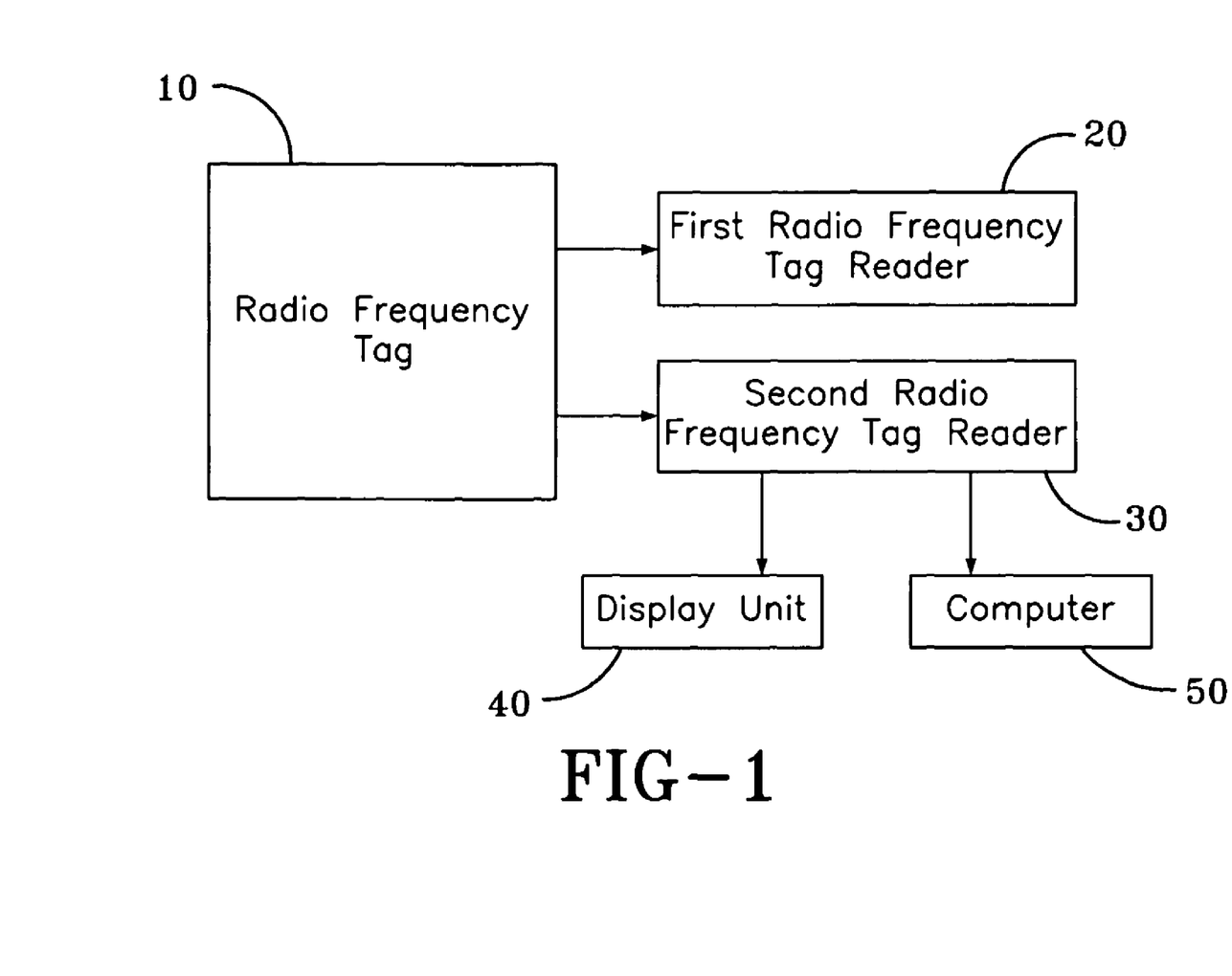
FIG. 1 is a conceptional view schematically illustrating the construction of a conventional record measurement system using a radio frequency tag.

Korean Patent Application Publication No. 2005-78066 discloses a track record measuring apparatus, which is illustrated in FIG. 1. As shown in FIG. 1, the track record measuring apparatus is constructed to grant a radio frequency tag 10 to each user, measure movement time and movement velocity of the user from a first radio frequency tag reader 20 and a second radio frequency tag reader 30 installed at a point of departure and a point of arrival, calculate exercise quantity of the user based on the measured movement time and movement velocity of the user using a computer 50, and display the calculated exercise quantity of the user through a display unit 40.

Unlike a track to which the track record measuring apparatus is applied, however, a park has a plurality of gates, with the result that it is not possible to specify a point of departure and a point of arrival. Furthermore, a park user does not move in one direction in the park but may freely change the movement direction as the user wishes. Consequently, the above-mentioned conventional technology is not applicable to the park.

SUMMARY OF THE INVENTION

Therefore, the present invention has been made in view of the above problems, and it is an object of the present invention to provide a park user management system that is capable of calculating exercise quantity of a park user irrespective of routes used by the park user in a park and providing tailored information to the park user through individual information of the park user, and a park user management method using the same.

In accordance with one aspect of the present invention, the above and other objects can be accomplished by the provision of a park user management system comprising a plurality of radio frequency tag readers installed along usable routes in a park for recognizing information stored in a radio frequency tag provided to each park user; and an exercise quantity management module for calculating exercise information of each park user using the respective recognition times of the radio frequency tag recognized by the radio frequency tag readers and providing the calculated exercise information to each park user.

Preferably, when the radio frequency tag is recognized, corresponding one of the radio frequency tag readers creates recognition information including radio frequency tag recognition time and a radio frequency tag reader identification in addition to a user tag code transmitted from the radio frequency tag.

Preferably, the park user management system further includes a user database for storing user information of each park user and the user tag code for each park user.

Preferably, the park user management system further includes an information processing module for retrieving a user information storage region from the user database using the user tag code and storing the radio frequency tag recognition time in the retrieved user information storage region.

Preferably, the park user management system further includes a radio frequency tag reader database for storing installation positions of the respective radio frequency tag readers, distances between the neighboring radio frequency tag readers, gradients of usable routes recognized by the respective radio frequency tag readers, and identifications of the respective radio frequency tag readers for each radio frequency tag reader.

Preferably, the user information includes a name, a resident registration number, sex, age, weight, height, an exercise target, a clinical history, or a park use history of each park user.

Preferably, the park user management system further includes a plurality of display units installed in the park for providing a recommendable exercise, a recommendable exercise section, and a recommendable target exercise quantity to each park user and displaying the exercise information of each park user calculated by the exercise quantity management module.

Preferably, the exercise information includes exercise velocity, exercise distance, or exercise quantity of each park user.

Preferably, the exercise quantity management module calculates exercise quantity of each park user from at least two selected from a group consisting of exercise velocity, exercise distance, exercise time, sex, age, and weight of each park user, and the gradients of the usable routes.

Preferably, when the difference between recognition times of the radio frequency tag recognized by two neighboring radio frequency tag readers exceeds a predetermined value, the exercise quantity management module calculates exercise quantity of each park user using an average exercise velocity of park users, and determines that each park user took a rest for a time resulting from the subtraction of exercise time between the two radio frequency tag readers calculated based on the average exercise velocity from the difference between the recognition times.

Preferably, when the same radio frequency tag is recognized by one of the radio frequency tag readers at a first recognition time and a second recognition time, the exercise quantity management module calculates exercise quantity of each park user from an average exercise velocity of park users and the difference between the first recognition time and the second recognition time.

Preferably, the exercise quantity management module includes a user-centric exercise information providing engine for deciding a recommendable exercise, a recommendable exercise section, and a recommendable target exercise quantity for each park user, using a name, a resident registration number, sex, age, weight, height, an exercise target, a clinical history, or a park use history of each park user, and providing the recommended exercise, the recommended exercise section, and the recommended target exercise quantity to each park user.

Preferably, the exercise quantity management module further includes an exercise quantity comparison module for comparing actual exercise quantity of each park user with the recommended target exercise quantity.

Preferably, the exercise quantity management module calculates exercise quantity per unit time (Kcal/min) of a park user from weight and exercise velocity of the park user using Equation 1 below based on criteria predetermined and inputted in consideration of exercise quantity per unit time depending upon weight as indicated above, and calculates exercise quantity of the park user from the calculated exercise quantity per unit time and exercise time of the park user.

$$\text{Exercise quantity per unit time (Kcal/min)} = \{METs \times 3.5 \times weight\ (kg)\}/200 \quad \text{[Equation 1]}$$

where, MET is a unit used to estimate oxygen consumption during a physical activity, such as exercise, 1 MET is a metabolic rate when the physical activity is stable. For example, at 1 MET, oxygen consumption is 3.5 ml/kg/min. Exercises have different METs depending upon the kinds of exercises.

Preferably, the exercise quantity of the park user is calculated based on the calculated exercise quantity per unit time and the exercise time of the park user.

Preferably, the radio frequency tag readers are also mounted at exercise equipment installed in the park.

In accordance with another aspect of the present invention, there is provided a park user management method comprising recognizing a radio frequency tag provided to each park user by any one of radio frequency tag readers installed on usable routes in a park, confirming a user tag code from the radio frequency tag by the radio frequency tag reader, creating recognition information including radio frequency tag recognition time and a radio frequency tag reader identification in addition to the user tag code by the radio frequency tag reader and transmitting the created recognition information to an information processing module by the radio frequency tag reader, retrieving a user information storage region from a user database using the user tag code by the information processing module and storing the radio frequency tag recognition time or the radio frequency tag reader identification in the retrieved user information storage region by the information processing module, and calculating and providing exercise information of each park user using the radio frequency tag recognition time by an exercise quantity management module.

Preferably, the park user management method further comprises determining whether the recognition information is duplicate or erroneous by the information processing module, and, when it is determined that the recognition information is duplicate or erroneous, discarding the recognition information by the information processing module.

Preferably, a method for calculating the exercise information by the exercise quantity management module comprises confirming radio frequency tag recognition times recognized by the respective radio frequency tag readers from the user database, confirming information on the installation positions of the radio frequency tag readers or information on the distances between the installation positions of the respective radio frequency tag readers from a radio frequency tag reader database using radio frequency tag reader identifications, and calculating exercise quantity of each park user using the radio frequency tag recognition times and the information on the installation positions of the radio frequency tag readers or the information on the distances between the installation positions of the respective radio frequency tag readers.

Preferably, the park user management method further comprises deciding a recommendable exercise, a recommendable exercise section, and a recommendable target exercise quantity for each park user, based on the user information acquired from the user database by the exercise quantity management module, and providing the recommended exercise, the recommended exercise section, and the recommended target exercise quantity to each park user as tailored information.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Now, preferred embodiments of the present invention will be described in detail with reference to the accompanying drawings to such an extent that the present invention can be easily embodied by a person having ordinary skill in the art to which the present invention pertains. However, the present invention may be implemented in various different forms, and therefore, the present invention is not limited to the illustrated embodiments.

First, a park user management system according to an embodiment of the present invention will be described in detail with reference to FIG. 2.

Figure 2:
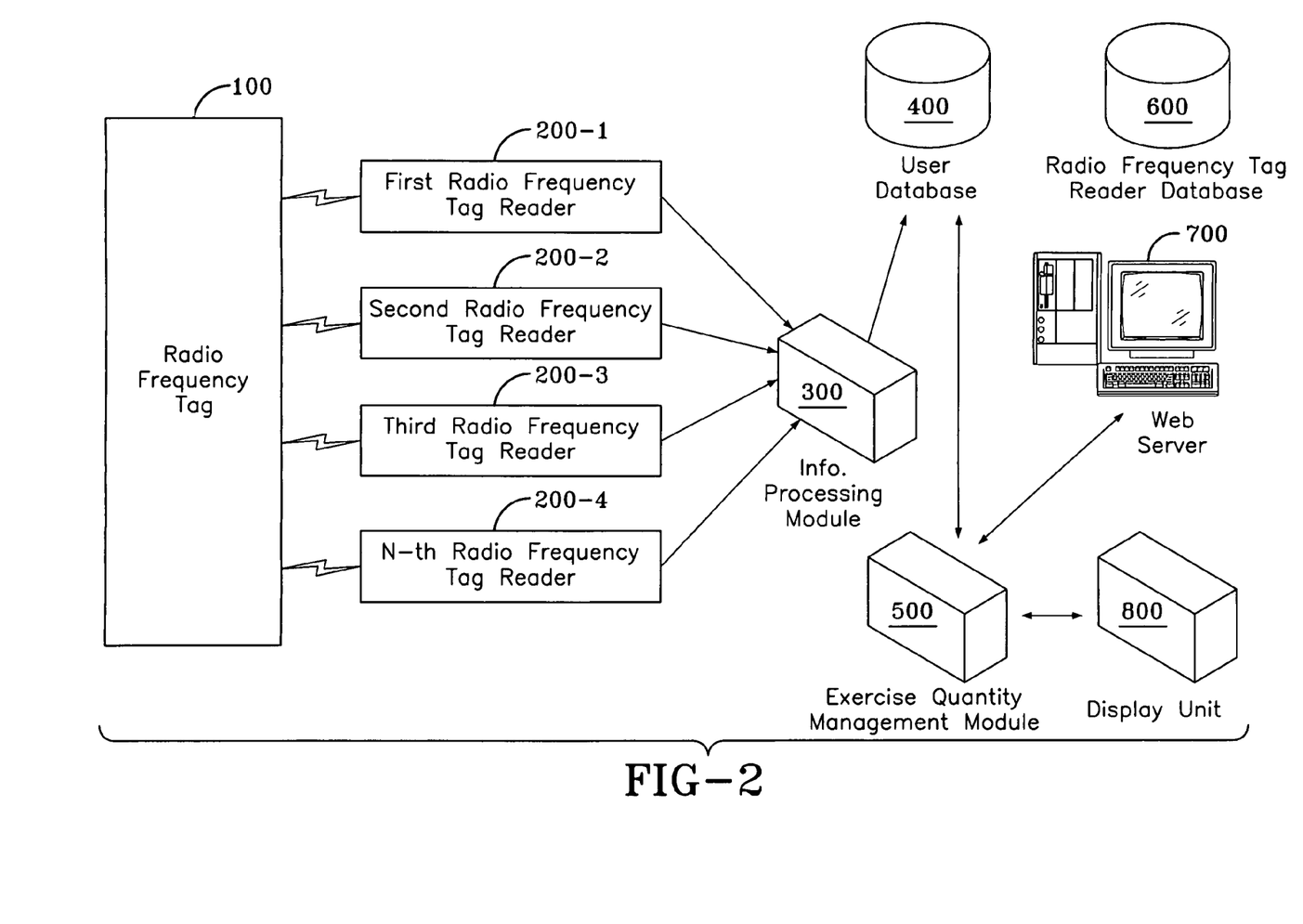
FIG. 2 is a conceptional view schematically illustrating the construction of a park user management system according to an embodiment of the present invention.

As shown in FIG. 2, the park user management system according to an embodiment of the present invention comprises a plurality of radio frequency tag readers 200, an information processing module 300, a user database 400, an exercise quantity management module 500, a radio frequency tag reader database 600, a web server 700, and display units 800.

The radio frequency tag readers 200 are installed along usable routes in a park at predetermined intervals. The radio frequency tag readers 200 are devices that are capable of reading information stored in a radio frequency tag 100. The radio frequency tag readers 200 are not particularly restricted so long as, when the radio frequency tag 100 is recognized, the radio frequency tag readers 200 can transmit recognition information, including a user tag code, recognition time read from the radio frequency tag 100, and radio frequency tag reader identification, to the information processing module 300.

In this embodiment, the recognition information is transmitted from the radio frequency tag readers 200 to the information processing module 300 through a communication network, such as TCP/IP, in a wireless communication method or a wire communication method.

In this embodiment, it is assumed that a radio frequency identification (RFID) tag is used as the radio frequency tag 100. In this case, an RFID recognition device that is capable of generating a predetermined magnetic alternating field, providing energy to the RFID tag to activate the RFID tag, and receiving information stored in the activated RFID tag is preferably used as each radio frequency tag reader 200.

Figure 3:
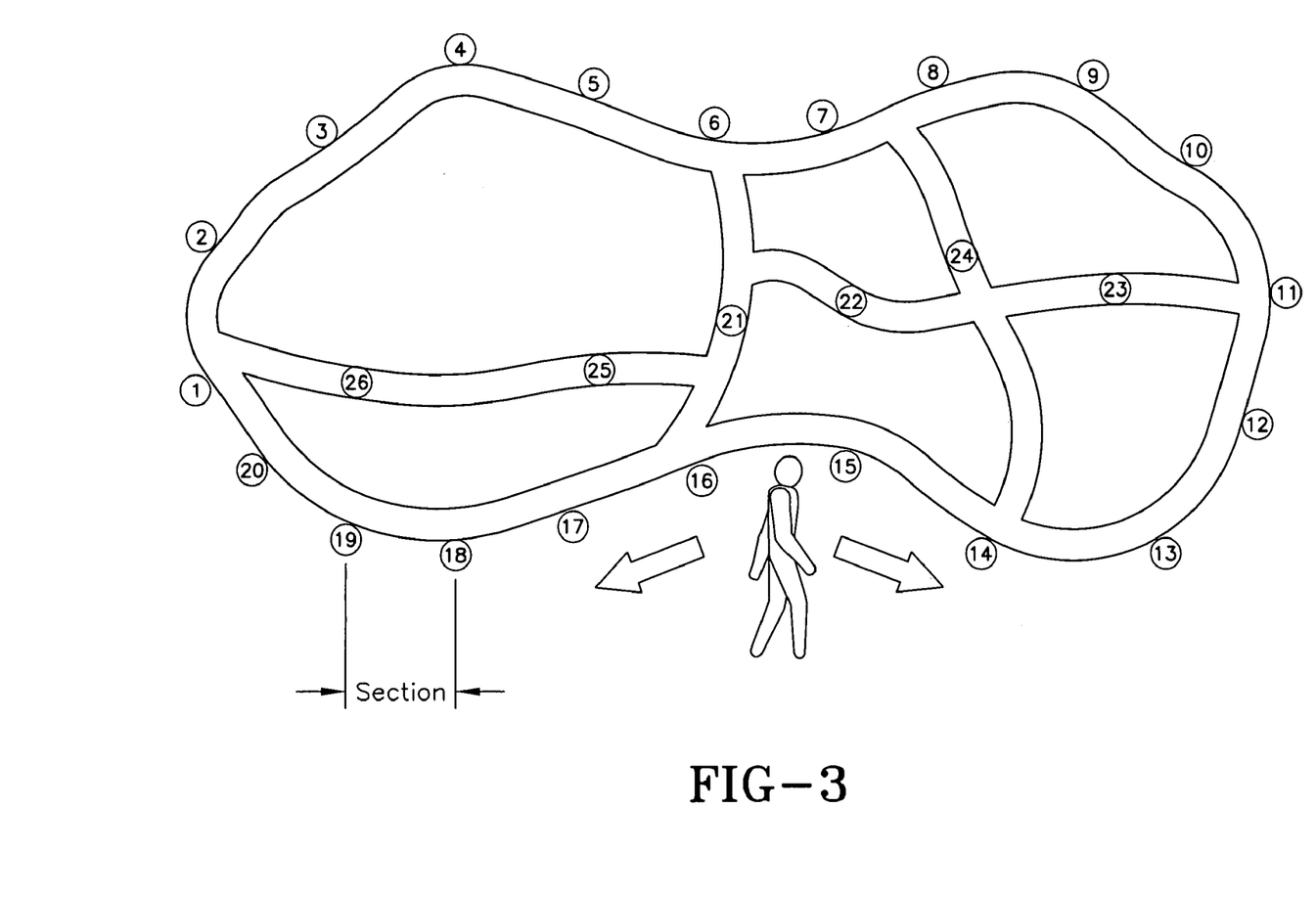
FIG. 3 is a view schematically illustrating a plurality of radio frequency tag readers installed along usable routes in a park.

In this embodiment, the radio frequency tag readers 200 are installed in a park in large numbers. In particular, as shown in FIG. 3, the radio frequency tag readers 200 are installed along each usable route in a park at predetermined intervals. Preferably, the radio frequency tag readers 200 are installed in numbers and at intervals sufficient to measure routes used by a user or exercise velocity of the user. FIG. 3 illustrates a total of 26 radio frequency tag readers 200 installed in a park, although the number of the installed radio frequency tag readers 200 may be increased or decreased depending upon the size of the park and the number of usable routes in the park.

When receiving the recognition information from the radio frequency tag readers 200, the information processing module 300 retrieves a user information storage region from the user database 400 using the user tag code in the recognition information, and stores recognition time and identification of the corresponding radio frequency tag readers 200 in the retrieved user information storage region.

At this time, information transmitted from the radio frequency tag readers 200 may be duplicate or erroneous. For this reason, the information processing module 300 may include a filtering mean or apparatus for removing duplicate or erroneous information. In the present invention, when the same information is repeatedly received within a predetermined time (for example, 1 second), the secondly received information is determined to be duplicate information. In addition, the information processing module 300 determines information which does not conform to a predetermined form, to be erroneous information, i.e., noise.

The user database 400 stores park user information for each park user. The park user information includes a name, a resident registration number, sex, age, weight, height, an exercise target, a clinical history (hyperpiesia, glycosuria, a cardiac disorder, etc.), a park use history, or the like of each park user. The park use history may include park use frequency, recognition time of the radio frequency tag readers 200 on a park use date in question, exercise quantity on the park use date in question, or the like.

The exercise quantity management module 500 acquires the recognition time of the radio frequency tag readers 200 stored in the user database 400 using a user tag code of a user concerned, acquires the installation positions of the radio frequency tag readers 200 from the radio frequency tag reader database 600 using identifications of the radio frequency tag readers 200, and calculates and provides exercise information of the user in the park using recognition time and information on the installation positions of the radio frequency tag readers 200. Preferably, the exercise information is exercise velocity, exercise distance, or exercise quantity of a park user on the day in question. The exercise quantity may include exercise quantity of the park user achieved by the park user's walking and running along usable routes in the park or exercise quantity of the park user achieved by the park user's exercising using exercise equipment installed in the park.

First, for convenience of description, a description will be given on the assumption that a park user runs or walks from a position where a first radio frequency tag reader 200-1 is installed to another position where a second radio frequency tag reader 200-2 is installed in one direction.

In this case, the exercise quantity management module 500 calculates the passage time of the park user from the position where the first radio frequency tag reader 200-1 is installed to the position where the second radio frequency tag reader 200-2 is installed, based on first recognition time recognized from the first radio frequency tag reader 200-1 and second recognition time recognized from the second radio frequency tag reader 200-2, stored in the user database 400; calculates the distance between the position where the first radio frequency tag reader 200-1 is installed and the position where the second radio frequency tag reader 200-2 is installed, according to information on the installation position of the first radio frequency tag reader 200-1 and information on the installation position of the second radio frequency tag reader 200-2, acquired from the radio frequency tag reader database 600; and calculates the exercise velocity of the park user from the position where the first radio frequency tag reader 200-1 is installed to the position where the second radio frequency tag reader 200-2 is installed, based on the calculated distance and passage time.

In detail, when the difference between the second recognition time and the first recognition time is 2 minutes, and the distance between the installation position of the first radio frequency tag reader 200-1 and the installation position of the second radio frequency tag reader 200-2 is 320 m, the exercise quantity management module 500 calculates the average exercise velocity of a park user from the installation position of the first radio frequency tag reader 200-1 to the installation position of the second radio frequency tag reader 200-2 to be 160 m/min. Thus, the distances between installation positions of the respective radio frequency tag readers 200 are stored in the radio frequency tag reader database 600, the exercise quantity management module 500 receives the distance between the installation position of the first radio frequency tag reader 200-1 and the installation position of the second radio frequency tag reader 200-2 from the radio frequency tag reader database 600, and calculates the exercise velocity of the park user based on the received distance.

Further, the exercise quantity management module 500 calculates exercise quantity of a park user in consideration of various factors, such as exercise velocity, exercise distance, exercise time, sex, age, and weight of the park user and gradients of usable routes.

First, for convenience of description, a description will be given on the assumption that exercise quantity is calculated only based on exercise velocity and exercise time. Here, exercise quantity of a park user means energy consumed by the park user.

Specifically, the exercise quantity management module 500 calculates exercise quantity of a park user from exercise velocity and exercise time of the park user based on predetermined and inputted criteria as indicated in Table 1 below.

TABLE 1

| Classification | Velocity | Exercise quantity per unit time (Kcal/min) |
|---|---|---|
| Walking | 50 m/min | 2.5 |
|  | 60 m/min | 2.7 |
|  | 70 m/min | 3.0 |
|  | 80 m/min | 3.5 |
|  | 90 m/min | 4.0 |
| Running | 120 m/min | 6.0 |
|  | 140 m/min | 7.0 |
|  | 160 m/min | 8.3 |
|  | 180 m/min | 9.8 |
|  | 200 m/min | 11.5 |

When the passage time of a park user from the installation position of the first radio frequency tag reader 200-1 to the installation position of the second radio frequency tag reader 200-2 is 2 minutes, and the passage velocity of the park user from the installation position of the first radio frequency tag reader 200-1 to the installation position of the second radio frequency tag reader 200-2 is 160 m/min, the exercise quantity management module 500 calculates exercise quantity of the park user to be 8.3 Kcal/min×2 min=16.6 Kcal, because the amount of energy consumed is 8.3 Kcal/min when the passage velocity of the park user is 160 m/min, as indicated in Table 1.

The exercise quantity per unit time of Table 1 indicating criteria for exercise quantity calculation is prepared for a person having standard weight, with the result that the exercise quantity per unit time may not be suitable for every person.

For this reason, it is preferred to change the exercise quantity per unit time based on weight as indicated in Table 2 below. In this case, the exercise quantity management module 500 can calculate exercise quantity in consideration of weight of a park user.

TABLE 2

| Weight | Velocity (m/min) | Exercise quantity per unit time (Kcal/min) |
|---|---|---|
| 68 | 70 | 3.451 |
| 70 | 70 | 3.553 |
| 72 | 70 | 3.654 |
| 74 | 70 | 3.756 |
| 76 | 70 | 3.857 |
| 78 | 70 | 3.959 |
| 80 | 70 | 4.060 |
| 82 | 70 | 4.162 |
| 84 | 70 | 4.263 |
| 86 | 70 | 4.365 |
| 88 | 70 | 4.466 |
| 90 | 70 | 4.568 |
| 92 | 70 | 4.669 |
| 94 | 70 | 4.771 |
| 96 | 70 | 4.872 |
| 98 | 70 | 4.974 |

Consequently, the exercise quantity management module 500 can calculate exercise quantity per unit time (Kcal/min) of a park user from weight and exercise velocity of the park user using Equation 1 below based on criteria predetermined and inputted in consideration of exercise quantity per unit time depending upon weight as indicated above, and calculate exercise quantity of the park user from the calculated exercise quantity per unit time and exercise time of the park user.

$$\text{Exercise quantity per unit time (Kcal/min)} = \{METs \times 3.5 \times weight\ (kg)\}/200 \quad [\text{Equation 1}]$$

Where, MET is a unit used to estimate oxygen consumption during a physical activity, such as exercise, 1 MET is a metabolic rate when the physical activity is stable. For example, at 1 MET, oxygen consumption is 3.5 ml/kg/min. Exercises have different METs depending upon the kinds of exercises. The kinds of exercises and corresponding METs may be predetermined as indicated in Table 3 below.

TABLE 3

| Exercise velocity of park user (m/min) | METs |
|---|---|
| 40 to 50 | 2.3 |
| 50 to 60 | 2.5 |
| 60 to 70 | 2.9 |
| 80 to 90 | 3.3 |
| 90 to 100 | 3.6 |
| 100 to 110 | 3.9 |
| 110 to 140 | 8.6 |
| 140 to 180 | 10.2 |
| 180 to 200 | 11.7 |
| 200 to 210 | 12.5 |
| 210 to 220 | 13.3 |
| 220 to 250 | 14.8 |
| 260 to 270 | 16.3 |

Consequently, the exercise quantity management module 500 retrieves METs corresponding to exercise velocity of the park user from Table 3 above, calculates exercise quantity per unit time based on the retrieved METs and the weight of the park user, and calculates exercise quantity of the park user based on the calculated exercise quantity per unit time and the exercise time of the park user.

In detail, METs during walking at a velocity of 70 m/min is 2.9 as indicated in Table 3, and therefore, exercise quantity per unit time of a person having a weight of 68 kg is calculated to be (2.9×3.5×68)/200=3.451 according to Equation 1 above. The calculated value is equal to that indicated in Table 2 above. When exercise time of the park user is 2 minutes, exercise quantity of the park user is calculated to be 3.451× 2=6.902 Kcal.

Eventually, the exercise quantity calculated by the exercise quantity management module 500 is decided based on the Weight, the exercise velocity, and the exercise time of the park user.

Also, usable routes, along which the radio frequency tag readers 200 are installed in the park, may have various gradients. Consequently, the park user has different exercise quantities depending upon the gradients of the usable routes in the park. Specifically, the exercise quantity increases more and more at an ascent, whereas the exercise quantity decreases more and more at a descent. Consequently, the exercise quantity management module 500 can calculate exercise quantity of a park user in further consideration of the change in exercise quantity depending upon the gradients of usable routes.

Also, the park user may freely exercise or take a rest in the park. Consequently, it is required for the exercise quantity management module 500 to consider such a case.

Specifically, when the exercise velocity is 160 m/min, the passage time from the installation position of the first radio frequency tag reader 200-1 to the installation position of the second radio frequency tag reader 200-2 is 2 minutes, and therefore, the distance between the installation position of the first radio frequency tag reader 200-1 and the installation position of the second radio frequency tag reader 200-2 is 320 m (160 m/min×2). Consequently, when the exercise velocity is 50 m/min to 200 m/min, the passage time from the installation position of the first radio frequency tag reader 200-1 to the installation position of the second radio frequency tag reader 200-2 is approximately 1.6 minutes to 6.4 minutes.

Accordingly, when the difference between the first recognition time of the radio frequency tag corresponding to the park user recognized by the first radio frequency tag reader 200-1 and the second recognition time of the radio frequency tag corresponding to the park user recognized by the second radio frequency tag reader 200-2 exceeds 6.4 minutes, the exercise quantity management module 500 may be set to determine that the park user took a rest at a position(s) between the installation position of the first radio frequency tag reader 200-1 and the installation position of the second radio frequency tag reader 200-2.

In this case, the exercise quantity management module 500 may calculate the exercise quantity of the park user at the section in question on the assumption that the park user passed from the installation position of the first radio frequency tag reader 200-1 to the installation position of the second radio frequency tag reader 200-2 at the average exercise velocity of park users on the day in question, and determines that the park user took a rest at the section in question for the remaining time excluding the passage time of the park user from the installation position of the first radio frequency tag reader 200-1 to the installation position of the second radio frequency tag reader 200-2 calculated based on the average exercise velocity.

On the other hand, the park user may freely change usable routes and exercise velocity in the park. Consequently, it is required for the exercise quantity management module 500 to also consider such a case.

That is, it may be assumed that after the park user moves from the installation position of the first radio frequency tag reader 200-1 to an installation position of a tenth radio frequency tag reader 200-10, the park user may move back to an installation position of a seventh radio frequency tag reader 200-7 from the installation position of the tenth radio frequency tag reader 200-10.

In this case, the tenth radio frequency tag reader 200-10 recognizes a radio frequency tag at a first recognition time and then further recognizes the same radio frequency tag at a second recognition time after the lapse of a predetermined time. Consequently, the exercise quantity management module 500 determines that the park user did not move to an installation position of an eleventh radio frequency tag reader 200-11, but moved back to the installation position of the tenth radio frequency tag reader 200-10 on the way to the installation position of an eleventh radio frequency tag reader 200-11, i.e., at a specific turning point, the predetermined time after the park user passed by the installation position of the tenth radio frequency tag reader 200-10. In this case, the exercise quantity management module 500 calculates the exercise quantity of the park user, on the assumption that the park user moved for a time corresponding to the time difference between the first recognition time and the second recognition time at the average exercise velocity on the day in question, to calculate the exercise quantity of the park user during the park user's movement from the installation position of the tenth radio frequency tag reader 200-10 to the turning point and return from the turning point.

Meanwhile, the exercise quantity management module 500 may further include a user-centric exercise information providing engine (not shown). In this case, the exercise quantity management module 500 may provide a recommendable exercise, a recommendable exercise section, and a recommendable target exercise quantity for each park user using the user-centric exercise information providing engine. The user-centric exercise information providing engine establishes the recommendable exercise, the recommendable exercise section, and the recommendable target exercise quantity based on sex, age, weight, height, a clinical history (hyperpiesia, glycosuria, a cardiac disorder, etc.), a park use history, or the like of a park user.

In particular, the user-centric exercise information providing engine may provide exercises to be prohibited or exercise sections to be prohibited based on the clinical history information of the park user. Specifically, when the park user has a history of arthritis, the user-centric exercise information providing engine prescribes exercises or exercise sections affecting articulation of the park user to be exercises or exercise sections to be prohibited. Even in establishing the recommendable target exercise quantity, the user-centric exercise information providing engine finds exercise quantity affecting the articulation of the park user from physical information of the park user, and recommends exercise quantity not affecting the articulation of the park user.

Meanwhile, when providing a recommendable exercise to the park user, the exercise quantity management module 500 may provide a method for taking the recommendable exercise to the park user. The method for taking the recommendable exercise is preferably provided in the form of a motion picture through the web server 700 or the display units 800.

Further, the exercise quantity management module 500 may compare the exercise quantity of the park user on the day in question with the recommended target exercise quantity, and provides the comparison result through the display units 800 to encourage the park user to achieve the recommended target exercise quantity on the day in question. The park user may directly decide the recommendable target exercise quantity from the user database 400. Also, the exercise quantity management module 500 may recommend exercise sections of the park, i.e., usable routes or exercise distance, suitable for the park user to achieve the recommended target exercise quantity.

Meanwhile, the user-centric exercise information providing engine may further include a tailored exercise table (not shown). When a tailored exercise corresponding to the user information acquired from the user database 400 is retrieved from the tailored exercise table, the user-centric exercise information providing engine provides the retrieved tailored exercise to the park user as a recommendable exercise. For example, the user-centric exercise information providing engine may confirm the clinical history of the park user from the user information acquired from the user database 400, retrieve an exercise helpful to the clinical history from the tailored exercise table, and provide the retrieved exercise to the park user as a recommendable exercise.

Meanwhile, the exercise quantity management module 500 may further include an exercise quantity comparison module (not shown). The exercise quantity comparison module may compare the current exercise quantity of the park user with the recommended target exercise quantity, and, when the exercise quantity of the park user is less than the recommended target exercise quantity, guide the park user to further take the exercise in question, or, when the exercise quantity of the park user is greater than the recommended target exercise quantity, guide the park user to interrupt or reduce the exercise in question.

Meanwhile, the exercise quantity management module 500 according to the present invention may calculate exercise velocity and exercise quantity of the park user for the respective sections defined by the radio frequency tag readers 200, and store the calculated exercise velocity and exercise quantity of the park user in the user database 400.

This embodiment suggests that the exercise quantity management module 500 manages the quantity of exercise, such as walking or running, of the park user in cooperation with the radio frequency tag readers 200 installed along the usable routes of the park; however, the present invention is not limited to the illustrated embodiment.

Specifically, various different kinds of exercise equipment may be installed in the park. When the radio frequency tag readers 200 are installed at the exercise equipment, the exercise quantity management module 500 acquires time for which a park, user used a specific exercise equipment from the corresponding radio frequency tag reader 200, and calculates exercise quantity of the park user from the criteria of exercise quantity based on the exercise time of the specific exercise equipment and the use time of the specific exercise equipment.

In this case, the exercise quantity management module 500 provides exercise equipment suitable for a park user and recommendable exercise quantities of the corresponding exercise equipment from the user information.

Meanwhile, the exercise quantity management module 500 may provide statistics of weekly, monthly, and annual exercise quantities of a park user from the user database 400.

The radio frequency tag reader database 600 stores the installation positions of the respective radio frequency tag readers 200, the distances between the installation positions of the respective radio frequency tag readers 200, and the radio frequency tag reader identifications of the respective radio frequency tag readers 200. Also, the radio frequency tag reader database 600 may further include gradients of usable routes detected by the respective radio frequency tag readers 200.

The web server 700 allows a park user accessing a web site of the park to confirm his/her exercise information. Specifically, when a park user needs his/her exercise information, the web server 700 communicates with the exercise quantity management module 500, retrieves the exercise information of the park user, and provides the retrieved exercise information to the park user. At this time, the web server 700 may provide user-centric exercise information, such as a recommendable exercise, a recommendable exercise section, and a recommendable target exercise quantity, to the park user. In addition, the web server 700 may provide a tailored expert column and consultation to the park user.

The display units 800 are installed in the park in large numbers. The display units 800 provide a recommendable exercise, a recommendable exercise section, and a recommendable target exercise quantity to a park user, and display exercise information on the day in question.

Preferably, the display units 800 are installed at least at the entrance and exit of the park such that a recommendable exercise, a recommendable exercise section, and a recommendable target exercise quantity are provided to a park user at the entrance of the park, and exercise information on the day in question is provided to the park user at the exit of the park. On the other hand, the display units 800 may be also installed along usable routes of the park. In this case, it is possible for the park user to acquire his/her exercise information during exercise from the display units 800. That is, the park user may easily acquire his/her exercise information, such as exercise time, exercise velocity, and exercise quantity, in the park in real time in the same manner as exercise on a treadmill. Also, the display units 800 may provide statistical information of weekly, monthly, and annual exercise quantities of a park user.

Figure 4:
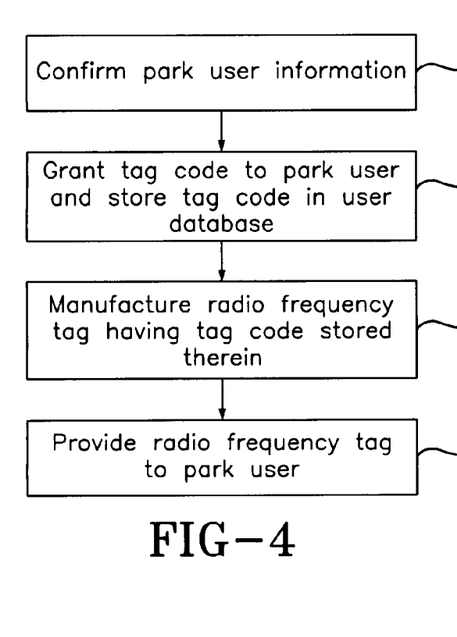
FIG. 4 is a flow chart schematically illustrating a method for manufacturing a radio frequency tag usable in the park user management system of FIG. 2.
Figure 5:
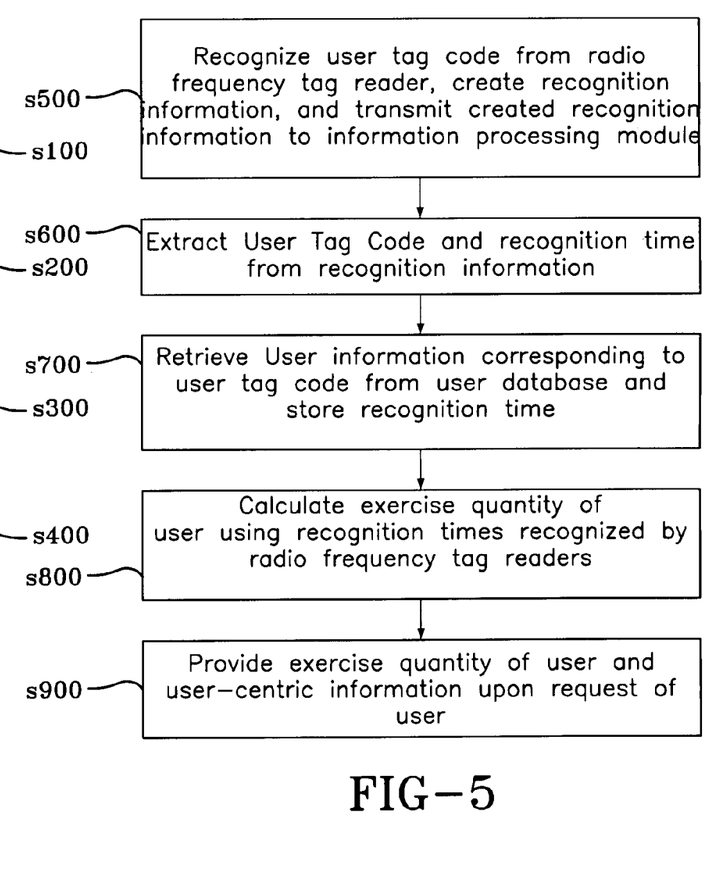
FIG. 5 is a flow chart schematically illustrating a method for managing a park user using the park user management system of FIG. 2.

Hereinafter, a park user management method using the park user management system with the above-stated construction according to an embodiment of the present invention will be described in detail with reference to FIGS. 4 and 5.

First, a method for granting a radio frequency tag to a park user will be described with reference to FIG. 4.

First, a park manager confirms user information from a park user (s100). The user information may include basic information, such as a name, age, and sex, of the park user, physical information, such as height and weight, of the park user, and clinical history information affecting exercise (hyperpiesia, glycosuria, a cardiac disorder, etc.), and exercise purpose, such as maintenance of his/her health, reinforcement of his/her muscular strength, or reduction of his/her weight.

After confirming the user information, the park manager creates a user tag code specific to the park user through a radio frequency tag granting device (not shown), and stores the created user tag code and user information in the user database (s200).

Subsequently, the park manager manufactures a radio frequency tag having the user tag code stored therein (s300). The radio frequency tag granting device is not particularly restricted so long as the radio frequency tag granting device can record and store predetermined information in the radio frequency tag, and therefore, a detailed description thereof will not be given.

Subsequently, the park manager provides the manufactured radio frequency tag to the corresponding park user (s400).

In this embodiment, only the user tag code is recorded and stored in the radio frequency tag. However, the present invention is not limited to the illustrated radio frequency tag. For example, the radio frequency tag may be configured to further store at least one of the above-described user information items in addition to the user tag code.

Hereafter, a park user management system according to the present invention will be described in detail with reference to FIG. 5, on the assumption that a park user carrying the radio frequency tag manufactured and provided as described above uses a park in which the park user management system according to the present invention is installed.

First, when the park user enters a radio frequency recognition radius of any one of the radio frequency tag readers 200 installed in the park, the corresponding radio frequency tag reader 200 activates the radio frequency tag 200 of the park user and recognizes a user tag code from the radio frequency tag 200.

Subsequently, the corresponding radio frequency tag reader 200 creates recognition information, such as recognized user tag code, radio frequency tag recognition time, and radio frequency tag reader identification, and transmits the created recognition information to the information processing module 300 (s500).

The information processing module 300 extracts the user tag code, the recognition time, and the radio frequency tag reader identification from the recognition information (s600). At this time, the information processing module 300 determines whether the recognition information is duplicate or erroneous, and, when it is determined that the recognition information is duplicate or erroneous, the information processing module 300 discards the recognition information.

Subsequently, the information processing module 300 retrieves user information corresponding to the user tag code from the user database 400 using the user tag code, and stores the radio frequency recognition time and the radio frequency tag reader identification in a user information storage region of the retrieved user (s700).

The exercise quantity management module 500 extracts radio frequency recognition times of the user created by the respective radio frequency tag readers 200 from the user database 400, extracts information of the installation positions of the respective radio frequency tag readers 200 or information of the distances between the installation positions of the respective radio frequency tag readers 200 from the radio frequency tag reader database 600 using the radio frequency tag reader identifications of the respective radio frequency tag readers 200, and calculates exercise quantity of the park user using the recognition times and the position information or the distance information (s800).

At this time, the exercise quantity management module 500 may provide user-centric information together with the calculated exercise quantity upon request of the park user (s900).

Specifically, the exercise quantity management module 500 may decide a recommendable exercise, a recommendable exercise section, and a recommendable target exercise quantity for the park user based on the user information acquired from the user database 400, and provide the recommendable exercise, the recommendable exercise section, and the recommendable target exercise quantity as tailored information. For example, the exercise quantity management module 500 may confirm the clinical history of the park user from the user database 400, retrieve an exercise helpful to the clinical history from the tailored exercise table, and provide the retrieved exercise to the park user as a recommendable exercise.

As apparent from the above description, the park user management system according to the present invention is capable of providing a recommendable exercise, a recommendable exercise section, and a recommendable target exercise quantity to a park user, calculating actual exercise quantity of the park user on the day in question, and providing the calculated exercise quantity to the park user.

Specifically, the park user management system according to the present invention is capable of providing exercise information, such as exercise time, exercise velocity, and amount of calories consumed during exercise, to the park user in real time using a radio frequency tag of the park user. Consequently, the present invention has the effect of inducing the park user to take exercise in the park. Also, the park user management system according to the present invention is capable of providing a recommendable exercise, a recommendable exercise section, and a recommendable target exercise quantity to the park user. That is, the park user management system according to the present invention is capable of presenting an exercise method tailored for each park user. Consequently, the present invention has the effect of enabling the park user to take exercise scientifically and effectively.

In using the park user management system according to the present invention and the park user management method using the same, it is possible to show the park user his/her exercise quantity with objective numerical values. Consequently, the present invention has the effect of inducing the park user to have a goal or interest in exercise.

Also, the park user management system according to the present invention is capable of receiving the user tag code of the park user from the radio frequency tag readers installed in the park, and therefore, it is possible for the park user to freely walk or run in the park irrespective of specific tracks or courses in the park. Consequently, the present invention has the effect of greatly improving exercise satisfaction of the park user.

The park user management system according to the present invention has the following other different effects in addition to the above-specified effects.

Specifically, the park user management system according to the present invention is capable of receiving positional information of the park user from the radio frequency tag readers installed all over the park in real time, acquiring the moving line of the park user using the received positional information, and easily confirming at which position the park user is located in the park at the present time. Consequently, the present invention has the effect of achieving considerable effects in searching for a missing child in the park.

Furthermore, the park user management system according to the present invention is capable of providing exercise information of the park user to a hospital which the park user usually goes to such that doctors of the hospital can accurately confirm exercise quantity of the park user. Consequently, the present invention has the effect of giving help in treating a disease(s) of the park user. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A park user management system comprising:
a plurality of radio frequency tag readers installed along usable routes in a park for recognizing information stored in a radio frequency tag provided to a respective park user;
a radio frequency tag reader database for storing installation positions of any two radio frequency tag readers of said plurality of radio frequency tag readers, distances between said two respective radio frequency tag readers, gradients of usable routes recognized by said two respective radio frequency tag readers, and identifications of said two respective radio frequency tag readers;
a user database for storing radio frequency tag recognition time of two respective radio frequency tag readers, and a user information of the respective park user; and
an exercise quantity management module for calculating exercise information of the respective park user passing between said two respective radio frequency tag readers by using information stored in the radio frequency tag reader database and said user database, said exercise information comprising an exercise velocity, an exercise distance, an exercise time, an exercise quantity per unit time, and an exercise quantity,
said exercise quantity per unit time being calculated using Equation 1, where Equation 1 is:
exercise quantity per unit time (Kcal/min)={METs× 3.5× a weight of the respective park user (kg)}/200, wherein said METs comprises a predetermined oxygen consumption during a physical activity depending on one or more predetermined factors selected from the exercise velocity of the respective park user, the weight of the respective park user, and the kinds of exercises of the respective park user;
said exercise quantity being calculated from said exercise quantity per unit time of the respective park user and the exercise time of the respective park user.

2. The park user management system according to claim 1, wherein, when a respective radio frequency tag reader recognizes information on the respective radio frequency tag, a corresponding one of said plurality of radio frequency tag readers creates a recognition information and a user tag code transmitted from said radio frequency tag.

3. The park user management system according to claim 2, wherein said user database stores the user information and said user tag code for each respective park user.

4. The park user management system according to claim 3, further comprising:
an information processing module for retrieving a user information storage region from said user database using the respective user tag code and storing a respective radio frequency tag recognition time in the retrieved user information storage region.

5. The park user management system according to claim 3, wherein the respective user information comprises at least one selected from the group consisting of a name, a resident registration number, sex, age, weight, height, an exercise target, a clinical history, and a park use history of each respective park user.

6. The park user management system according to claim 5, further comprising:
a plurality of display units installed in the park for displaying a recommendable exercise, a recommendable exercise section, and a recommendable target exercise quantity and displaying the exercise information of each park user calculated by the exercise quantity management module.

7. The park user management system according to claim 6, wherein said exercise quantity management module further includes an exercise quantity comparison module for comparing the exercise quantity of each respective park user with the recommendable target exercise quantity.

8. The park user management system according to claim 5, said user data base stores the respective sex, age and weight of the respective park user, and wherein the exercise quantity management module calculates said exercise quantity of each respective park user from at least two selected from the group consisting of the exercise velocity, the exercise distance, the exercise time, the sex, the age, and the weight of each respective park user, and the gradients of the usable routes of the respective park user.

9. The park user management system according to claim 2, wherein said recognition information is selected from the group consisting of said radio frequency tag recognition time and a radio frequency tag reader identification.

10. The park user management system according to claim 1, wherein at least some of said radio frequency tag readers are mounted at exercise equipment installed in the park.

11. A park user management system comprising:
a plurality of radio frequency tag readers installed along usable routes in a park for recognizing information stored in a radio frequency tag provided to each park user; and
an exercise quantity management module for calculating exercise information of each park user using respective recognition times of the radio frequency tag recognized by the radio frequency tag readers and providing the calculated exercise information to each park user;
wherein, when the difference between recognition times of the radio frequency tag recognized by two neighboring radio frequency tag readers exceeds a predetermined value, the exercise quantity management module calculates exercise quantity of each respective park user using an average exercise velocity of respective park users, and determines that each respective park user took a rest for a time resulting from the subtraction of exercise time between the two radio frequency tag readers calculated based on the average exercise velocity from the difference between the recognition times.

12. A park user management system comprising:
a plurality of radio frequency tag readers installed along usable routes in a park for recognizing information stored in a radio frequency tag provided to each park user; and
an exercise quantity management module for calculating exercise information of each park user using respective recognition times of the radio frequency tag recognized by the radio frequency tag readers and providing the calculated exercise information to each park user;
wherein, when the same radio frequency tag is recognized by one of the radio frequency tag readers at a first recognition time and a second recognition time, the exercise quantity management module calculates exercise quantity of each respective park user from an average exercise velocity of respective park users and the difference between the first recognition time and the second recognition time.

13. A park user management method comprising the steps of:
recognizing a radio frequency tag provided to each park user by any one of a plurality of radio frequency tag readers installed on usable routes in a park;
storing radio frequency tag reader information of any two radio frequency tag readers of the plurality of radio frequency tag readers in a radio frequency tag reader database, said radio frequency tag reader information comprising installation positions of the two radio frequency tag readers, distances between the two radio frequency tag readers, gradients of usable routes recognized by the two radio frequency tag readers, and identifications of the two radio frequency tag readers;
storing a recognition time of the two radio frequency tag readers and user information of a park user in a user database;
calculating exercise information of the park user passing between the two radio frequency tag readers in an exercise quantity management module by using the radio frequency tag reader information stored in the radio frequency tag reader database and the recognition time stored in the user database, said exercise information comprising an exercise velocity, an exercise distance, an exercise time, an exercise quantity per unit time as set forth below, and an exercise quantity, and
using Equation 1 to calculate the exercise quantity per unit time, where Equation 1 is:
exercise quantity per unit time (Kcal/min)={METs× 3.5× weight of the user (kg)}/200, wherein said METs comprises a predetermined oxygen consumption during a physical activity depending on one or more predetermined factors selected from the exercise velocity, the user's weight, and the kinds of exercises.

14. The park user management method according to claim 13, further comprising the step of:
creating recognition information from the radio frequency tag readers when recognizing the radio frequency tag, the recognition information including the radio frequency tag recognition time, a radio frequency tag reader identification and a user tag code transmitted from the radio frequency tag;
determining whether the recognition information is duplicate or erroneous by using an information processing module; and
discarding the duplicate or erroneous recognition information.

15. The park user management method according to claim 13, further comprising the step of:

deciding a recommendable exercise, a recommendable exercise section, and a recommendable target exercise quantity for each park user, based on the user information acquired from the user database by the exercise quantity management module, and providing the recommended exercise, the recommended exercise section, and the recommended target exercise quantity to each park user as tailored information.

* * * * *